United States Patent [19]

Kikuzawa et al.

[11] 3,983,184
[45] Sept. 28, 1976

[54] UNSATURATED POLYESTER RESIN COMPOSITION

[75] Inventors: Kenji Kikuzawa, Ooimachi; Kilchiro Sasaguri, Tokyo; Yasuyoshi Oda, Iwaki; Hiroshi Sano, Iwaki; Katsumi Okina, Iwaki, all of Japan

[73] Assignee: Asahi Kasei Kogyo Kabushiki Kaisha, Osaka, Japan

[22] Filed: Dec. 30, 1974

[21] Appl. No.: 537,406

Related U.S. Application Data

[63] Continuation-in-part of Ser. No. 368,020, June 8, 1973, abandoned.

[30] Foreign Application Priority Data

June 14, 1972 Japan.............................. 47-58545

[52] U.S. Cl. ..................... 260/837 R; 260/40 R; 260/865; 526/317
[51] Int. Cl.² ................... C08L 63/10; C08L 67/06
[58] Field of Search ............. 260/865, 837 R, 40 R, 260/86.1 R, 78.5 UA

[56] References Cited
UNITED STATES PATENTS

| | | | |
|---|---|---|---|
| 3,468,839 | 9/1969 | Millane................................ | 260/38 |
| 3,560,253 | 2/1971 | Ashton................................ | 117/123 |
| 3,631,217 | 12/1971 | Rabenold............................ | 260/863 |
| 3,669,911 | 6/1972 | Najvar ................................ | 260/2.5 N |
| 3,676,398 | 7/1972 | D'Alelio............................ | 260/47 EP |
| 3,721,643 | 3/1973 | Vargiu et al. ..................... | 260/40 R |
| 3,789,030 | 1/1974 | Volgstadt et al. ............ | 260/29.6 NR |
| 3,795,717 | 3/1974 | Vargiu et al. ......................... | 260/865 |

FOREIGN PATENTS OR APPLICATIONS 1,017,050  1/1966  United Kingdom................. 260/865

*Primary Examiner*—Lewis T. Jacobs
*Assistant Examiner*—E. A. Nielsen
*Attorney, Agent, or Firm*—Cooper, Dunham, Clark, Griffin & Moran

[57] ABSTRACT

Fire retardant unsaturated polyester resin compositions are prepared by intimate mixing of unsaturated polyester resins and 100–900 parts by weight of hydrated magnesium carbonate per 100 parts by weight of polyester resin. Such compositions when reinforced with glass are suitable for use in building fire retardant interiors.

14 Claims, 1 Drawing Figure

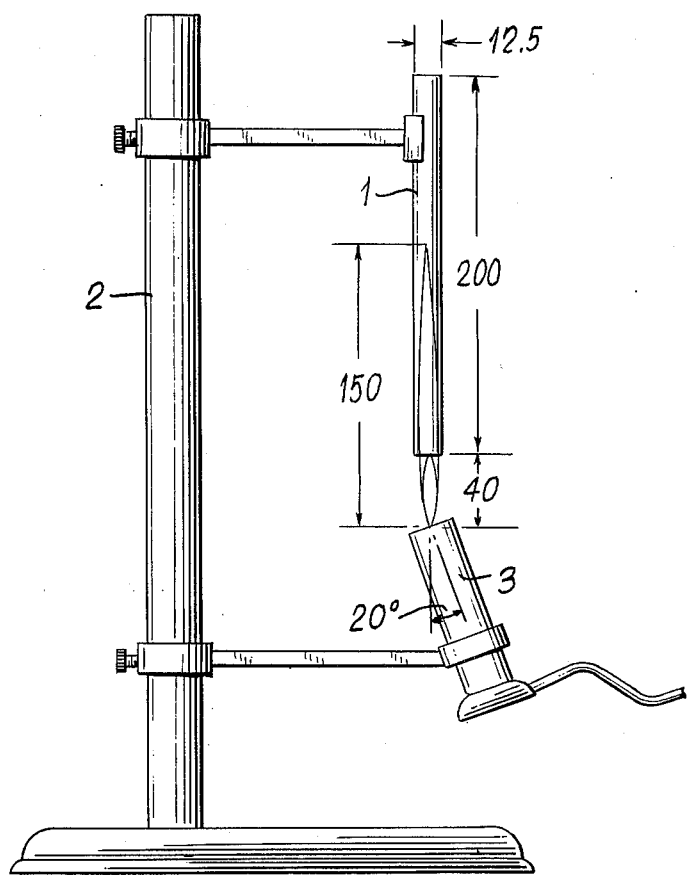

3,983,184

UNSATURATED POLYESTER RESIN COMPOSITION

RELATED APPLICATION

This application is a continuation-in-part application of copending application Ser. No. 368,020 filed June 8, 1973, now abandoned.

BACKGROUND OF THE INVENTION

Prior attempts to provide a high degree of fire retardancy to ordinarily flammable unsaturated polyester resins have involved the addition of one or more of brominated or chlorinated compounds, phosphates, antimony compounds or other additives to the unsaturated polyester resin, or the preparation of unsaturated polyesters containing bromine or chlorine in the polymeric structures. None of these approaches has proved to be completely satisfactory. For example, bromine or chlorine containing compounds incorporated in the resin generate poisonous gas upon combustion, and phosphates cause degradation of unsaturated polyester resins by hydrolysis.

Basic magnesium carbonate has been widely employed in the resins as a temperature sealing material in order to enhance fire retardancy. However because of its high degree of oil absorbency, only a small amount of basic magnesium carbonate (up to about 30% by weight) can be incorporated in the resin.

THE INVENTION

It has now been discovered that hydrated magnesium carbonate which is ordinarily unstable can be incorporated into specifically selected unsaturated polyester resins in relatively large amounts because of its low oil absorbency. Further, hydrated magnesium carbonate undergoes crystal transition to basic magnesium carbonate at a temperature between 50°C and 150°C and becomes harder. The novel compositions thus formed are fire retardant and are suitable for use in structures which may undergo prolonged exposure to high temperature.

The compositions of the invention are normally employed with reinforcing materials such as are mentioned hereinafter. A preferred material is glass fiber which is normally added to the resin in an amount of from about 10 to 30% by weight based on the total weight of the composition. The use of appreciably larger amounts of reinforcing agent is not economically attractive, and amounts appreciably less than 10% do not impart sufficient reinforcing effect to molded articles prepared from the compositions.

The resin compositions of this invention typically comprise 100 parts by weight of unsaturated polyester resin and 100–900 parts by weight of hydrated magnesium carbonate. The preferred amount of hydrated additive is 200–500 parts by weight based on 100 parts by weight of resin. Lesser amounts of magnesium carbonate reduce fire retardancy, while larger amounts tend to adversely affect the molding procedure. The optimum amount for particular molding compositions will depend upon the additives employed, and the amounts thereof.

Hydrated magnesium carbonate as herein used refers to magnesium carbonate trihydrate represented by the formula $MgCO_3 \cdot 3H_2O$, magnesium carbonate pentahydrate represented by a formula $MgCO_3 \cdot 5H_2O$ or mixtures of both compounds. In this description of the invention, the amounts of hydrated magnesium carbonate reported are based on magnesium carbonate trihydrate.

A wide variety of structures with diverse physical properties can be prepared from the compositions of the present invention by variations in molding techniques. Usually when hydrated magnesium carbonate decomposes into basic magnesium carbonate, it generates gaseous $H_2O$ and carbon dioxide which facilitate the formation of foamed products. The foaming imparts heat sealing and sound absorbing properties to the molded products.

The unsaturated polyester resins utilized in the present invention may be prepared from a vinyl compound and a prepolymer having at least two functionally reactive terminal groups. One class of prepolymer includes products formed by reaction between
1. at least one dicarboxylic acid,
2. at least one glycol and
3. at least one unsaturated dicarboxylic acid.

The second class of prepolymer is the reaction product of
1. an epoxy compound and
2. an unsaturated acid or ester such as methyl methacrylate.

The second class of prepolymers is characterized by the presence of terminal double bonds.

Typical dicarboxylic acids employed in their preparation include: phthalic acid anhydride, isophthalic acid, terphthalic acid, endomethylenetetrahydrophthalic acid anhydride, tetrahydrophthalic acid anhydride, hexahydrophthalic acid anhydride, succinic acid, adipic acid, azelaic acid, sebacic acid, tetrachlorophthalic acid anhydride, tetrabromophthalic acid anhydride, and hexachlorocyclopentadienetetrahydrophthalic acid anhydride.

Glycols which may be employed include: ethyleneglycol; propyleneglycol; butanediol-1, 4; butanediol-1, 3; butanediol-2, 3; diethyleneglycol; dipropyleneglycol; triethyleneglycol; pentadiol-1, 5; hexanediol-1, 6; neopentyl glycol; 2,2,4-trimethylpentanediol-1, 3; hydrogenated bisphenol A; 2,2-di(4-hydroxypropoxyphenyl) propane; pentaerythritol; diallyl alcohol; glycerol; trimethylene glycerol; 2-ethylhexanediol-1,3; phenylglycidylether; and allylglycidylether.

Maleic acid anhydride, fumaric acid, citraconic acid and itaconic acid are typical examples of useful unsaturated acids.

The thus prepared prepolymer is reacted with from about 20 to 70% by weight of a vinyl compound. Typical vinyl compounds which may be mentioned by way of example are styrene, vinyl toluene, chlorostyrene, α-methyl styrene, divinylbenzene, methyl methacrylate, methyl acrylate, ethyl acrylate, vinyl acetate, diallylphthalate, triallylcyanurate, diallylbenzene phosphonate, N-vinyl pyrrolidone, maleinimide, dimethylstyrene.

The second class of prepolymers are epoxy compounds and include polyepoxy compounds having at least two terminal epoxy groups. The unsaturated resins are formed by reaction between the epoxy terminated prepolymer and an unsaturated acid or ester, typically acrylic acid or a lower alkyl ester or a lower alkyl substituted acid or lower alkyl ester. Lower alkyl refers to alkyl groups containing up to about four carbon atoms. The preferred products are represented by the formula:

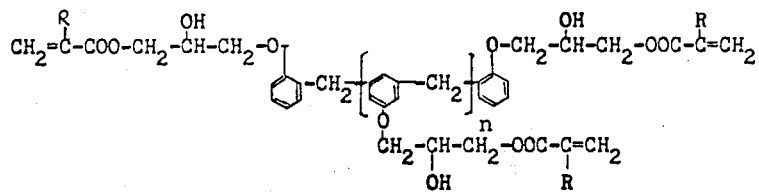

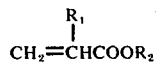

which is prepared, for example, from

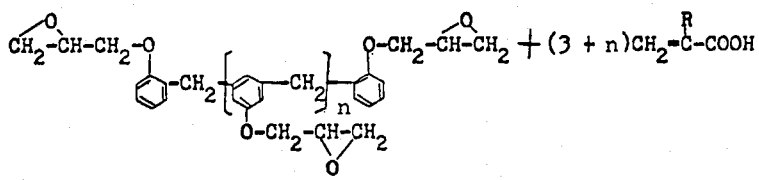

wherein $n = 0$ to 3

$R = H$ or $CH_3$ wherein $R_1$ is hydrogen or methyl and $R_2$ is hydrogen, methyl or ethyl.

While a variety of epoxy compounds can be employed, the presently preferred products are:

1. Bisphenol-type vinyl esters represented by the formula:

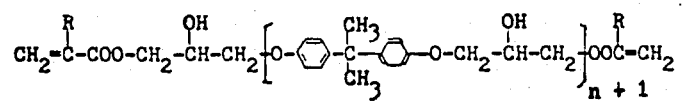

which is prepared, for example, from

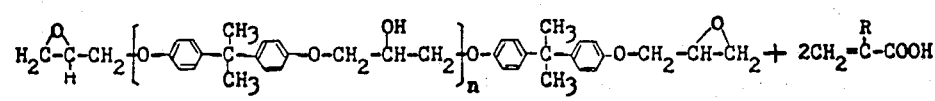

wherein $n = 0$ to 15

$R = H$ or $CH_3$

2. Novolac-type vinyl esters represented by the formula:

3. Alicyclic vinyl esters represented by the formula:

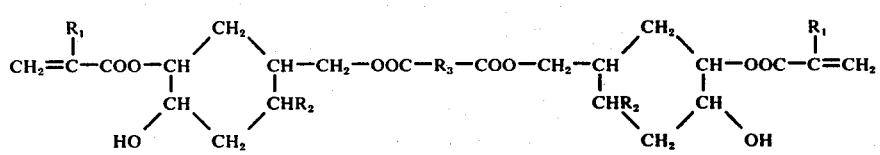

which is prepared, for example, from

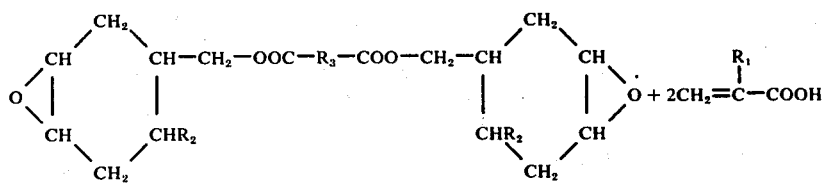

wherein $R_1 = H$ or $CH_3$ $R_2 = H$ or $CH_3$ $R_3 =$ alkylene group having 2 to 4 carbon atoms or phenylene group 4. Polyglycol-type vinyl esters represented by the formula:

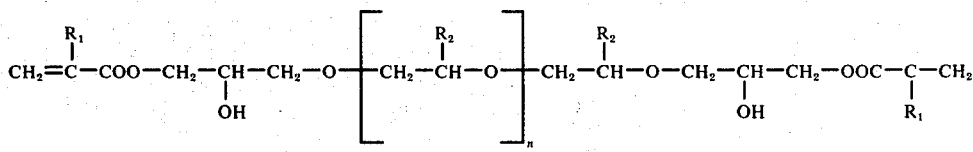

which is prepared, for example, from

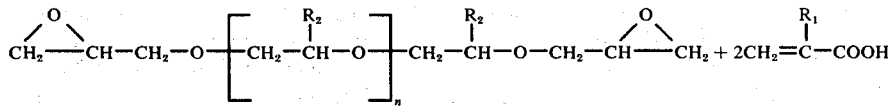

wherein $R_1 = H$ or $CH_3$ $R_2 = H$ or $CH_3$ $n = 0$ to $10$

The fire retardant polymer resin composition of the present invention may contain appropriate amounts of various conventional additives which may include, for example, fillers such as calcium carbonate, magnesium carbonate, barium sulfate, calcium sulfate, clay, alumina, kaolin, talc, diatomaceous earth, silica gel, mica powder, pulverized glass fiber, pulverized asbestos; reinforcing agents such as glass fiber, vinylon fiber, nylon fiber, polyester fiber, carbon fiber, fibroid metal, boron fiber, whisker, linen, pigments and the like.

Conventional curing agents such as benzoyl peroxide tert-butylperbenzoate, lauroyl peroxide, cyclohexanone peroxide, cumene hydroperoxide, dicumyl peroxide, or ditertiarybutyl diperoxyphthalate are usually used.

Alternative methods of molding the compositions of the present invention are generally illustrated below.

The resin and hydrated magnesium carbonate in the selected proportions and the filler, if employed, is uniformly and thoroughly mixed utilizing, for example, a shear mixer or kneader. If a reinforcing material is employed, it may be added to the whole mixture just prior to the completion of the mixing step. The resulting mixture is cold-pressed and then placed in a curing furnace kept at 100°C – 150°C. Alternatively, the mixture may be pressure-molded in a hot-press at 100°C to 150°C over a period of from 30 seconds to five minutes depending upon the desired thickness of the molded plate. Another method is to inject the mixture into a die at a temperature of from 100°C to 150°C with an injection or a transfer machine.

Following are non-limiting examples given by way of illustration only. In these examples, the measurement of degree of retardancy of specimen were made basically in accordance with Hooker's intermittent flame test (Society of Plastics Industry 17th Ed. (1962)) shown in FIG. 1. Following is a description of the test.

PROCEDURE

Specimen Preparation

Material to be tested is a flat plate with the dimensions of 20 cm (length) × 1.25 cm (width) × 0.3 cm (thickness).

Edges are smooth and rectangular.

Five specimens of each material evaluated are tested.

Apparatus Preparation

The burner flame is adjusted to a four cm inner blue cone with a flame height of approximately 15 cm.

The axis of the burner is at an angle of 20° from vertical.

Testing Procedure

The specimen is clamped vertically so that the tip of the inner blue cone of the flame just touches the lower edge of the 1.25 cm dimension of the specimen.

The flame is applied to the specimen and then removed according to the schedule in the following table which also shows the method of rating the specimens.

TABLE

| Flame Applications | On Time (seconds) | Off Time (seconds) | Points | Total Points |
|---|---|---|---|---|
| 1 | 5 | 10 | 4 | 4 |
| 2 | 7 | 14 | 4 (additional) | 8 |
| 3 | 10 | 20 | 4 '' | 12 |
| 4 | 15 | 30 | 4 '' | 16 |
| 5 | 25 | 50 | 4 '' | 20 |

In the table, "On Time" represents the time that the sample is exposed to the flame. "Off Time" represents the maximum time of burning. For example, any burn time less than 5 seconds is recorded as 5, and a burn time between 5 and 7 seconds is rated 7. Points are arbitrarily set in increments of 4. A sample which burns no more than 5 seconds on the first flame application is given a point total of 4, and then subjected to the second flame application. If it passes this test, it is awarded 4 more points for a total of 8. If in any particular set of five samples, two samples carry through three ignitions and three samples carry through four ignitions, the rating for the product would be 72.

In the examples, quantities are expressed in parts by weight unless otherwise indicated.

EXAMPLE 1

A prepolymer was prepared from 2.2 moles of diethylene glycol, 1 mole of maleic acid anhydride and 1 mole of phthalic acid anhydride. The acid value of the prepolymer was 40. The polyester resin liquid was prepared from this prepolymer and 30% by weight of styrene. To one hundred parts of resulting resin liquid were added one part of benzoyl peroxide (BPO) as a catalyst, two parts of zinc stearate as a mold release agent and the quantities of hydrated magnesium carbonate shown in Table 2. The composition was mixed in a shear mixer and then molded to a flat plate having the dimensions of 20 mm × 200 mm × 3 mm with an injection molding machine at 130°C for four minutes.

Thus plate was uniformly foamed. Specimens were cut from this plate and subjected to the fire retardancy test. The results are shown in Table 2.

EXAMPLE 2

2.2 moles of diethylene glycol, 1 mole of maleic acid anhydride and 1 mole of isophthalic acid were reacted to produce a prepolymer having acid value of 35. To the prepolymer was added 35% of styrene to produce unsaturated polyester resin liquid. To 100 parts of this resin liquid, there were added one part of BPO, two parts of zinc stearate and hydrated magnesium carbonate in the amounts shown in Table 3. The resulting mixture was fabricated into a 3 mm thick flat plate by injection molding at 130°C for four minutes. Five specimens were cut out from this plate and subjected to fire retardance tests. The results are shown in Table 3.

EXAMPLE 3

To 100 parts of resin as prepared in Example 1, there were added one part of BPO, two parts of zinc stearate and hydrated magnesium carbonate in the amounts shown in Table 4. The composition was mixed in a kneader and the resulting mixture was pressure-molded at a pressure of 50 kg/cm² at 130°C for four minutes using a die to give a 3 mm thick flat plate. Five specimens were cut out from each plate and subjected to retardancy tests. The results are shown in Table 4.

EXAMPLE 4

The resin as prepared in Example 2 was used. To 100 parts of the resin were added 150 parts of hydrated magnesium carbonate, one part BPO, two parts of zinc stearate and 20% by weight of 0.6 cm long chopped glass strands. The composition was mixed in a kneader to form premix, which was then molded in a press at 130°C for 4 minutes to form a 3 mm thick flat plate. The molded plate was uniformly foamed. When subjected to fire retardancy testings the point total was 92.

EXAMPLE 5

The resin as prepared in Example 2 was used. To 100 parts of the resin, there were added 100 parts of hydrated magnesium carbonate and one part BPO, two parts of zinc stearate, which were thoroughly mixed in a shear mixer and poured onto 450 g of matted continuous glass strand. The composition was pressure-molded at 130°C for 4 minutes to form a 3 mm thick flat plate. The content of glass fiber was 30% by weight. Specimens were cut out from this plate and tested. The point total was 76.

EXAMPLE 6

The resin as prepared in Example 1 was used. One hundred parts of the resin, calcium carbonate and hydrated magnesium carbonate in amounts as specified in Table 5, one part of BPO, one part of zinc stearate and 20% by weight of 0.6 cm chopped glass strands were mixed in a kneader and then pressure-molded at 130°C for 4 minutes to form a 3 mm thick flat plate. Specimens were cut out from this plate and subjected to the fire retardancy test. The results are shown in Table 5.

EXAMPLE 7

One hundred parts of tetrachlorophthalic acid anhydride fire retardant unsaturated polyester resin (chlorine content 15%; styrene content 35%), one part of BPO, one part of zinc stearate, 60 parts of hydrated magnesium carbonate and 70 parts of calcium carbonate (or 100 parts of hydrated magnesium carbonate and 50 parts of calcium carbonate) and 20% by weight of 0.6 cm long chopped glass strands were mixed in a kneader and then pressure-molded at 130°C for 4 minutes to form a 3 mm thick flat plate. Specimens were cut out from this plate and subjected to the fire retardancy test. The points for each sample were 60 and 84.

EXAMPLE 8

Unsaturated polyester was prepared by the same method as Example 1 except that fumaric acid was used in place of maleic acid anhydride and 50% by weight of vinyl toluene based on the weight of prepolymer was used instead of styrene. To 100 parts of thus obtained unsaturated polyester resin were added 450 parts of centrifuged hydrated magnesium carbonate obtained containing 30% by weight of water in addition to the water of crystallization, one part of BPO, and three parts of zinc stearate. The composition was thoroughly mixed in a kneader. The mixture was placed between two mats of continuous glass strand weighing 300 g/m² and pressed at an instantaneous pressure of 180 kg/cm² which was then reduced to 0 kg/cm². After 10 minutes, the molded article was released from the die. Die temperature was 135°C. Thus obtained molded article was uniformly foamed.
  Specific gravity: 0.9
  Content of glass fiber: 20%
  Bending strength: 4 kg/cm²
  Oxygen index according to ASTMD 2863 (1970): 76
  Fire retardancy for building material as prescribed in JIS A1321: 2nd class

EXAMPLE 9

Unsaturated polyester was prepared by the method of Example 8 except that 30% by weight of chlorostyrene was used in place of vinyl toluene. To 100 parts of thus obtained unsaturated polyester resin there were added 300 parts of centrifuged hydrated magnesium carbonate containing 30% water in addition to the water of crystallization, one part of BPO and three parts of zinc stearate. The composition was thoroughly mixed in a kneader and then was placed between two mats of continuous glass strand weighing 450 g/m². They were pressure molded with dies heated at 135°C. Pressure of 100 kg/cm² was applied to dies and immediately removed. The molded article was placed between dies for another ten minutes. The resulting molded article contained 30% by weight glass, was 3 mm thick and was uniformly foamed.
  Specific gravity: 0.95
  Bending strength: 5 kg/cm²
  Fire retardancy: Oxygen index 62 as prescribed under ASTM D2863

EXAMPLE 10

Prepolymer as prepared in Example 2 was used. Unsaturated polyester resin liquid was prepared by adding styrene to the prepolymer so that content of styrene was 65%. One hundred parts of this resin liquid, centrifuged hydrated magnesium carbonate containing 30% water in addition to the water of crystallization in the amounts specified in Table 6, one part of BPO and three parts of zinc stearate were mixed in a kneader. The mixture was molded as described in Example 8 using two glass mats weighing 300 g/m². Oxygen indices as determined by ASTM D2863 ('70) are shown in Table 6.

TABLE 1

| On Time (Seconds) | Off Time (Seconds) | Points (Per One Specimen) |
|---|---|---|
| 5 | 10 | 4 |
| 7 | 14 | 8 |
| 10 | 20 | 12 |
| 15 | 30 | 16 |
| 25 | 50 | 20 |

TABLE 2

| Amount of Resin | Amount of Hydrated Magnesium Carbonate | Points |
|---|---|---|
| 100 | 0 | 0 |
| 100 | 100 | 76 |
| 100 | 120 | 84 |
| 100 | 150 | 92 |
| 100 | 200 | 100 |

TABLE 3

| Amount of Resin | Amount of Hydrated Magnesium Carbonate | Points |
|---|---|---|
| 100 | 0 | 0 |
| 100 | 100 | 72 |
| 100 | 150 | 92 |
| 100 | 200 | 100 |

TABLE 4

| Amount of Resin | Amount of Hydrated Magnesium Carbonate | Points |
|---|---|---|
| 100 | 300 | 100 |
| 100 | 500 | 100 |
| 100 | 800 | 100 |

TABLE 5

| Amount of Resin | Amount of Calcium Carbonate | Amount of Added Hydrated Magnesium Carbonate | Points |
|---|---|---|---|
| 100 | 60 | 100 | 72 |
| 100 | 100 | 60 | 64 |
| 100 | 160 | 40 | 44 |

TABLE 6

| Amount of Resin | Amount of Hydrated Magnesium Carbonate[2] | Oxygen Index (Prescribed under ASTM D2863) |
|---|---|---|
| 100 | 300 | 54 |
| 100 | 400 | 62 |
| 100 | 450[1] | 76 |
| 100 | 500[1] | 80 |
| 100 | 550[1] | 85 |

Notes:
[1]The above specimens were graded second class fire retardant materials according to JIS A1321 building material fire retardancy standards.
[2]This amount means the amount of centrifuged hydrated magnesium carbonate containing 30% water in addition to the water of crystallization.

EXAMPLE 11

To epoxy resin DER 332 condensation product from bisphenol A and epichlorohydrin manufactured by Dow Chemical (with an epoxy equivalent of 172–178 and a viscosity of 40–64 poise), acrylic acid was added so as to make the ratio of carboxyl group to epoxy group 1.25/1. Pyridine was added as a catalyst in an amount of 1/6 parts by weight based on acrylic acid and ionol as a polymerization inhibitor in an amount of 1/10 parts by weight of acrylic acid were further added. The reaction was carried out at 90°–100°C for 5 hours. After the reaction, the excess acrylic acid was removed by distilling under reduced pressure. To the thus obtained vinyl ester prepolymer, 50% by weight of styrene was added to obtain a resin with a viscosity of 1 poise. To 100 parts by weight of this styrene-containing resin, 2 parts by weight of BPO, 2 parts by weight of zinc stearate and centrifuged hydrated magnesium carbonate containing 30% water in addition to the water of crystallization in an amount of 200, 300, 400 and 500 parts by weight, respectively, as shown in Table 7 below were added, blended by a kneader and molded by a press with or without employing glass fiber mat (weighing 450 g/m$^2$) of continuous strand (glass content being 30% by weight. The molding conditions were 130°C for 6 minutes. The oxygen index of the sheet with a thickness of 3 mm is shown in the table 7. With respect to oxygen index, no appreciable difference was observed between the sheets with and without glass fiber.

TABLE 7

| Amount of Resin | Amount of Hydrated Magnesium Carbonate containing 30% water | Oxygen Index ASTM D2863 |
|---|---|---|
| 100 | 200 | 40 |
| 100 | 300 | 52 |
| 100 | 400 | 65 |
| 100 | 500 | 85 |

EXAMPLE 12

The same reaction as in Example 11 was followed except for the use of Novolac type epoxy resin D.E.N. 431 manufactured by Dow Chemical Co. having the general formula:

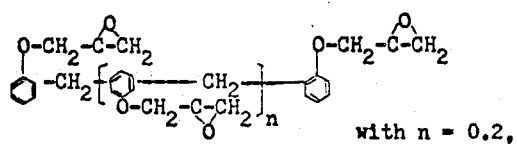

with n = 0.2, and an epoxy equivalent of 172–179 and viscosity of 14–20 poise in place of DER 332 in Example 11. By adding 50% by weight of styrene, there was obtained a resin with a viscosity of 5 poise. Using this resin, a magnesium carbonate mold sheet was manufactured by the same molding procedure as in Example 11. The oxygen index of mold sheets were as reported in Table 8.

TABLE 8

| Amount of Resin | Amount of Hydrated Magnesium Carbonate containing 30% water | Oxygen Index |
|---|---|---|
| 100 | 200 | 45 |
| 100 | 300 | 57 |

TABLE 8-continued

| Amount of Resin | Amount of Hydrated Magnesium Carbonate containing 30% water | Oxygen Index |
|---|---|---|
| 100 | 400 | 67 |
| 100 | 500 | 85 |

EXAMPLE 13

The same reaction as in Example 11 was effected except that epoxy resin DER 736, a polyglycol type, having the general formula:

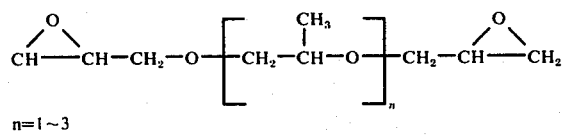

n=1~3 epoxy equivalent of 175–205 and viscosity of 0.3–0.6 poise was used in place of the DER 332 of Example 11 and methacrylic acid was used in place of the acrylic acid. By adding 50% by weight of styrene, there was obtained vinyl ester resin with viscosity of 0.1 poise. Using this resin, a magnesium carbonate sheet was manufactured following the same molding procedures as in Example 11. The oxygen index of the thus obtained mold sheets were as reported in Table 9.

TABLE 9

| Amount of Resin | Amount of Hydrated Magnesium Carbonate containing 30% water | Oxygen Index |
|---|---|---|
| 100 | 200 | 38 |
| 100 | 300 | 50 |
| 100 | 400 | 60 |
| 100 | 500 | 75 |

What is claimed is:

1. Fire retardant unsaturated polyester resin composition comprising:
    1. 100 parts by weight of unsaturated polyester resin which is the reaction product of a mixture containing
        a. 80% – 30% by weight of unsaturated polyester prepolymer prepared by condensation of at least one dicarboxylic acid, at least one glycol and at least one unsaturated dicarboxylic acid; or the reaction product of an epoxy compound having at least two 1,2 epoxy groups and a compound of the formula:

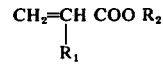

wherein $R_1$ is hydrogen or lower alkyl and $R_2$ is hydrogen or lower alkyl;

b. 20% – 70% by weight of at least one vinyl compound; and
    2. 100 – 900 parts by weight of hydrated magnesium carbonate represented by a general formula $MgCO_3, nH_2O$ (n=3 or 5).

2. A resin composition as claimed in claim 1 wherein said dicarboxylic acid is phthalic acid anhydride, said unsaturated dicarboxylic acid is maleic acid anhydride and said glycol is diethylene glycol.

3. A resin composition as claimed in claim 1 wherein said hydrated magnesium carbonate is used in an amount of from 200 to 500 parts by weight.

4. A resin composition as in claim 1 wherein $R_1$ is hydrogen or methyl and $R_2$ is hydrogen, methyl or ethyl.

5. A resin composition as in claim 1 wherein the epoxy compound reaction product is of the formula:

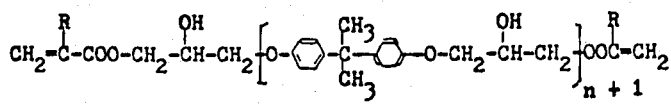

wherein R is hydrogen or methyl and n is 0 to 15.

6. A resin composition as in claim 1 wherein the epoxy compound reaction product is of the formula:

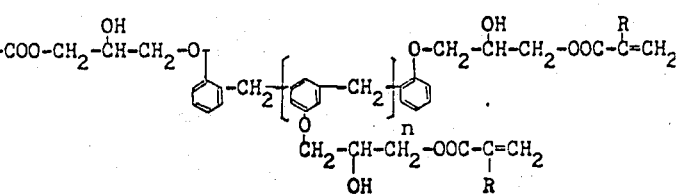

wherein R is hydrogen or methyl and n is 0 to 3.

7. A resin composition as in claim 1 wherein the epoxy compound reaction product is of the formula:

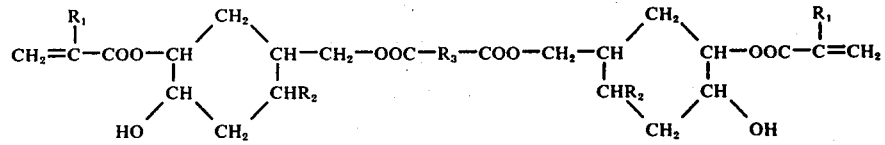

wherein $R_1$ is hydrogen or methyl, $R_2$ is hydrogen or methyl and $R_3$ is alkylene having 2 to 4 carbon atoms or phenylene.

8. A resin composition as in claim 1 wherein the epoxy compound reaction product is of the formula:

$$CH_2{=}\overset{R_1}{\underset{|}{C}}{-}COO{-}CH_2{-}\underset{\underset{OH}{|}}{CH}{-}CH_2{-}O\left[{-}CH_2{-}\underset{\underset{}{|}}{\overset{R_2}{C}H}{-}O{-}\right]_n{-}CH_2{-}\overset{R_2}{\underset{|}{C}H}{-}O{-}CH_2{-}\underset{\underset{OH}{|}}{CH}{-}CH_2{-}OOC{-}\overset{R_1}{\underset{|}{C}}{=}CH_2$$

wherein $R_1$ is hydrogen or methyl, $R_2$ is hydrogen or methyl and $n$ is 0 to 10.

9. Fire retardant unsaturated polyester resin composition comprising:
   1. 100 parts by weight of unsaturated polyester resin which is the reaction product of a mixture containing a. 80% – 30% by weight of unsaturated polyester prepolymer prepared by condensation of at least one dicarboxylic acid, at least one glycol and at least one unsaturated dicarboxylic acid; or the reaction product of an epoxy compound having at least two 1,2 epoxy groups and a compound of the formula:

$$CH_2{=}\underset{\underset{R_1}{|}}{C}HCOOR_2$$

wherein $R_1$ is hydrogen or lower alkyl and $R_2$ is hydrogen or lower alkyl;

b. 20% – 70% by weight of at least one vinyl compound; and 2. 100 – 900 parts by weight of hydrated magnesium carbonate represented by a general formula $MgCO_3, nH_2O$ ($n=3$ or $5$) and 10% – 30% by weight of reinforcing material based on the weight of said resin and hydrated magnesium carbonate.

10. A composition as in claim 9 wherein $R_1$ is hydrogen or methyl and $R_2$ is hydrogen, methyl or ethyl.

11. A composition as in claim 9 wherein the epoxy compound reaction product is of the formula:

$$CH_2{=}\overset{R}{\underset{|}{C}}{-}COO{-}CH_2{-}\overset{OH}{\underset{|}{C}H}{-}CH_2\left[{-}O{-}\underset{\underset{CH_3}{|}}{\overset{\overset{CH_3}{|}}{C}}{-}{-}O{-}CH_2{-}\overset{OH}{\underset{|}{C}H}{-}CH_2\right]_{n+1}{-}OOC{-}\overset{R}{\underset{|}{C}}{=}CH_2$$

wherein $R$ is hydrogen or methyl and $n$ is 0 to 15.

12. A composition as in claim 9 wherein the epoxy compound reaction product is of the formula:

$$CH_2{=}\overset{R}{\underset{|}{C}}{-}COO{-}CH_2{-}\overset{OH}{\underset{|}{C}H}{-}CH_2{-}O{-}\left[\bigcirc{-}CH_2{-}\underset{\underset{O}{|}}{\bigcirc}{-}CH_2\right]_n{-}\bigcirc{-}O{-}CH_2{-}\overset{OH}{\underset{|}{C}H}{-}CH_2{-}OOC{-}\overset{R}{\underset{|}{C}}{=}CH_2$$
$$CH_2{-}\underset{\underset{OH}{|}}{C}H{-}CH_2{-}OOC{-}\underset{\underset{R}{|}}{C}{=}CH_2$$

wherein $R$ is hydrogen or methyl and $n$ is 0 to 3.

13. A composition as in claim 9 wherein the epoxy compound reaction product is of the formula:

$$CH_2{=}\overset{R_1}{\underset{|}{C}}{-}COO{-}\underset{\underset{HO}{\diagdown}\underset{CH_2}{\diagup}}{\overset{\diagup CH_2 \diagdown}{CH}}\underset{CHR_2}{\overset{CH}{}}CH{-}CH_2{-}OOC{-}R_3{-}COO{-}CH_2{-}\underset{CHR_2}{\overset{\diagup CH_2 \diagdown}{CH}}\underset{\underset{CH_2}{\diagdown}\underset{OH}{\diagup}}{CH}{-}OOC{-}\overset{R_1}{\underset{|}{C}}{=}CH_2$$

wherein $R_1$ is hydrogen or methyl, $R_2$ is hydrogen or methyl and $R_3$ is alkylene having 2 to 4 carbon atoms or phenylene.

14. A composition as in claim 9 wherein the epoxy compound reaction product is of the formula:

$$CH_2{=}\overset{R_1}{\underset{|}{C}}{-}COO{-}CH_2{-}\underset{\underset{OH}{|}}{CH}{-}CH_2{-}O\left[{-}CH_2{-}\overset{R_2}{\underset{|}{C}H}{-}O{-}\right]_n{-}CH_2{-}\overset{R_2}{\underset{|}{C}H}{-}O{-}CH_2{-}\underset{\underset{OH}{|}}{CH}{-}CH_2{-}OOC{-}\overset{R_1}{\underset{|}{C}}{-}CH_2$$

wherein $R_1$ is hydrogen or methyl, $R_2$ is hydrogen or methyl and $n$ is 0 to 10.

* * * * *